United States Patent [19]
Yuki et al.

[11] Patent Number: 4,731,983
[45] Date of Patent: Mar. 22, 1988

[54] LAWN MOWER

[75] Inventors: Mikio Yuki; Niro Bando; Kazuaki Kurohara; Hiroshi Itatani, all of Sakai; Fumihiro Ikeda, Osaka; Hiroyuki Ogasawara, Izumi; Nobuyuki Yamashita, Sakai; Masaji Kure, Kishiwada, all of Japan

[73] Assignee: Kubota, Ltd., Osaka, Japan

[21] Appl. No.: 835,831

[22] Filed: Mar. 3, 1986

[30] Foreign Application Priority Data

| Mar. 8, 1985 | [JP] | Japan | 60-33657[U] |
| Mar. 9, 1985 | [JP] | Japan | 60-47091 |
| Sep. 13, 1985 | [JP] | Japan | 60-203787 |
| Sep. 13, 1985 | [JP] | Japan | 60-203788 |

[51] Int. Cl.$^4$ .............................................. A01D 34/03
[52] U.S. Cl. ................................. 56/202; 56/320.1
[58] Field of Search ............ 56/202, 16.6, 320.1, 56/320.2

[56] References Cited

U.S. PATENT DOCUMENTS

| 4,470,246 | 9/1984 | Donigan | 56/202 |
| 4,532,756 | 8/1985 | Mukel | 52/202 |

Primary Examiner—George A. Suchfield
Attorney, Agent, or Firm—Jordan and Hamburg

[57] ABSTRACT

A lawn mower comprises a vehicle body, a cutting unit mounted below the vehicle body, a grass catcher mounted rearwardly of the vehicle body, and a discharge duct extending between the cutting unit and the catcher for transmitting grass clippings from the cutting unit to the catcher. The catcher defines an opening at which a lid member is removably mounted, the lid member includes a coupler opening for coupling to a discharge opening of the discharge duct and an air vent around the coupler opening. The catcher is switchable between a sideways turned posture in which the coupler opening is coupled to the discharge opening and an upright posture in which the coupler opening is directed upwardly.

13 Claims, 13 Drawing Figures

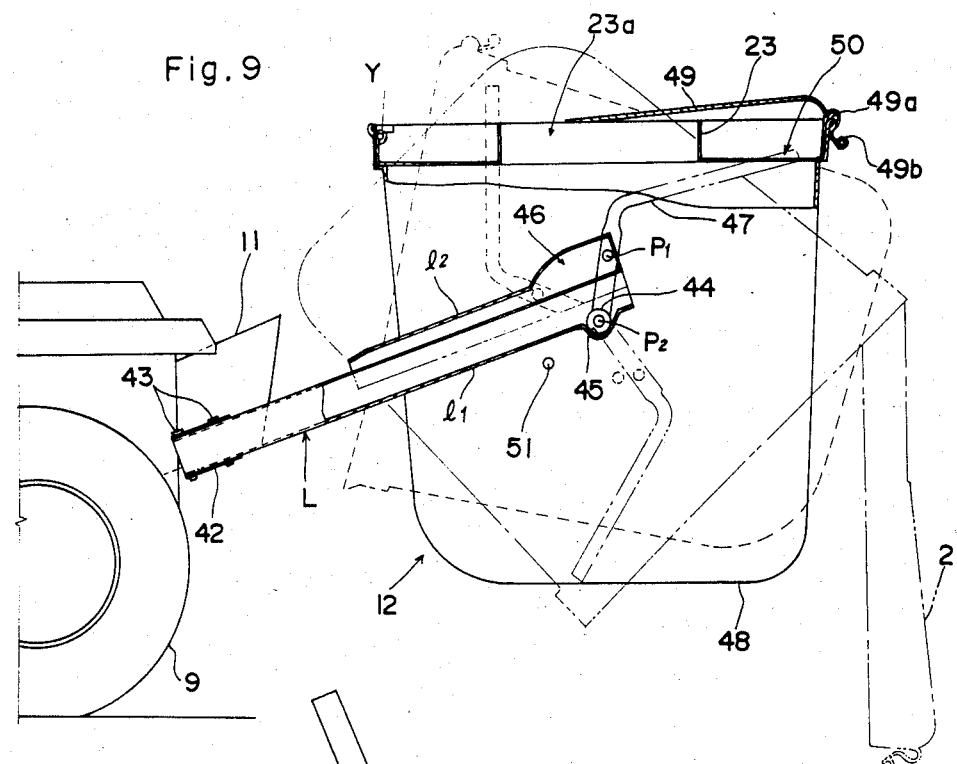
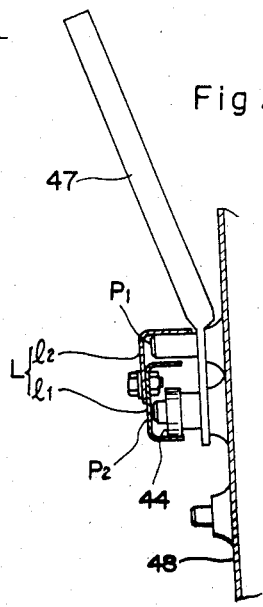

LAWN MOWER

BACKGROUND OF THE INVENTION

The present invention relates generally to a lawn mower, and more particularly to a lawn mower constructed to feed grass clippings from a cutting unit to a grass catcher through a discharge duct.

A conventional lawn mower of this type comprises a stationary grass catcher defining an outlet opening in a side wall or a bottom wall thereof for disposal of grass clippings filling the catcher (see U.S. Pat. No. 4,104,852 for example).

However, an attempt to collect the grass clippings reliably and easily by transferring the clippings to disposable bags or the like and collect the disposable bags filled with the clippings at a selected location, tends to encounter the inconvenience that a considerable amount of clippings spill from the outlet opening or the mouths of the disposable bags during the transfer of the clippings from the grass catcher to the bags. This results in poor collecting efficiency and requires the trouble of dealing with the split grass clippings.

SUMMARY OF THE INVENTION

An object of the present invention is to provide an improved lawn mower comprising a grass catcher readily switchable between a position or posture to receive grass clippings from a cutting unit and a posture to dispose of the clippings when full, whereby the discharge duct has little chance of becoming blocked and the disposal of grass clippings filling the catcher is carried out smooothly.

According to one aspect of the invention, a lawn mower comprises a vehicle body, a cutting unit mounted below the vehicle body, a grass catcher mounted rearwardly of the vehicle body and including an opening in one side thereof, a discharge duct extending between the cutting unit and grass catcher and including a discharge opening for transmitting grass clippings from the cutting unit to the grass catcher, and a lid member removably attached to the opening of the grass catcher and including a coupler opening for coupling to the discharge opening of the discharge duct and an air vent around the coupler opening, wherein the grass catcher is switchable between a sideways turned posture in which the coupler opening is coupled to the discharge opening and an upright posture in which the coupler opening is directed upwardly.

With the above construction the grass catcher assumes the sideways turned posture having the coupler opening positioned laterally for receiving grass clippings. This has the effect of reducing a difference in level (lift) between the cutting unit and the coupler opening, wherefore the grass clippings are smoothly transmitted to the coupler opening only by a blasting force of the cutting unit and without any need to provide an auxiliary device such as a blower in the discharge duct. Moreover, the air vent provided around the coupler opening has an advantage over the case of an air vent provided in the bottom opposite the lid member in that the air vent defined in the lid member does not become blocked by the grass clippings gradually accumulating from the bottom upward in the grass catcher. Therefore, the grass catcher may be filled to its full capacity in spite of the sideways mode of taking in the grass clippings.

After the grass catcher is filled with the grass clippings, the grass catcher is switched to the upright posture with the lid member facing upwardly for disposal of the grass clippings. Therefore, a polyethylene or other disposable bag may be mounted in the grass catcher prior to a mowing operation, for receiving the grass clippings through the coupler opening and for pulling the bag upwardly after the bag is filled with the grass clippings, the grass catcher is turned to the upright posture and the lid member is removed. This arrangement does not require a manual operation to transfer the grass clippings from the catcher to the bag but promotes effective use of the disposable bags.

According to a further aspect of the invention, a lawn mower comprises a vehicle body, a cutting unit mounted below the vehicle body, a grass catcher mounted rearwardly of the vehicle body and including an opening in one side thereof, a discharge duct extending between the cutting unit and grass catcher and including an end defining a discharge opening for transmitting grass clippings from the cutting unit to the grass catcher, a lid member removably attached to the opening of the grass catcher and including a socket opening engageable with the end of the discharge duct and an air vent defined around the socket opening, and grass catcher posture switch means for switching the grass catcher between a sideways turned posture in which the end of the discharge duct is positioned in the socket opening and an upright posture in which the socket opening is directed upwardly.

With this construction the switching between the grass receiving posture and the grass disposing posture is effected by the grass catcher posture switch means such that the step of disengaging the socket opening of the grass catcher from the discharge duct and the step of turning the grass catcher to the upright posture are carried out continuously. Compared, for example, with the arrangement wherein the grass catcher is the stationary type and the discharge duct is flexible so that the discharge opening is withdrawn from the socket opening of the grass catcher utilizing its flexibility and thereafter the grass catcher is turned to the upright posture by means of a separate control lever, the construction according to the present invention permits the discharge duct to extend into the socket opening of the grass catcher, preventing spilling of the grass clippings from this position, facilitates the operation and does not require switch mechanisms for both the grass catcher and the discharge duct. Furthermore, mishandling to change the posture of the grass catcher is prevented with the socket of the grass catcher in engagement with the discharge opening.

BRIEF DESCRIPTION OF THE DRAWINGS

The above and other objects and features of the present invention will become apparent from the following description taken in conjunction with the preferred embodiments thereof with reference to the accompanying drawings, in which:

FIG. 9 is a side view of the grass catcher in one phase of its movement caused by the switching mechanism, FIG. 10 a view in vertical section showing a discharge duct support structure.

DETAILED DESCRIPTION OF THE PREFERRED EMBODIMENTS

Figure 1:
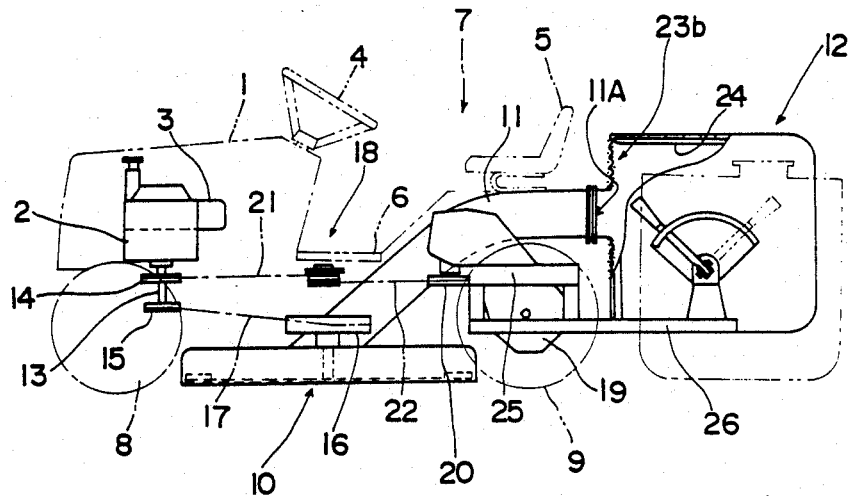
FIG. 1 is a side elevation of a lawn mower embodying the invention.

Referring to FIG. 1, a lawn mower shown therein comprises a hood 1 provided at a front of the vehicle body and enclosing an engine 2 and a fuel tank 3, and a driver's section 7 provided at a rear portion of the vehicle body and including a steering wheel 4, a driver's seat 5 and right and left flat decks 6, with the vehicle body supported by front and rear wheels 8, 9. The mower further comprises a cutting unit 10 mounted between the front wheels 8 and the rear wheels 9, a discharge duct 11 extending rearwardly from the cutting unit 10 and through a space between the right and left rear wheels 9, and a grass catcher 12.

The mower has a drive transmission mechanism including a downwardly extending output shaft 13 of the engine 2 and a upper and a lower output pulleys 14 and 15 mounted on the output shaft 13. The part of the transmission mechanism related to the working implement or cutting unit includes a belt 17 interconnecting the lower pulley 15 and an input pulley 16 mounted on an input shaft of the cutting unit 10. The part of the transmission mechanism related to the propelling system of the mower includes an input pulley 20 of a transmission case 19 connected by means of belts 21 and 22 to the upper output pulley 14 through a stepless change speed device 18 for driving the rear wheels 9 journaled at a bottom of the transmission case 19.

Figure 2:
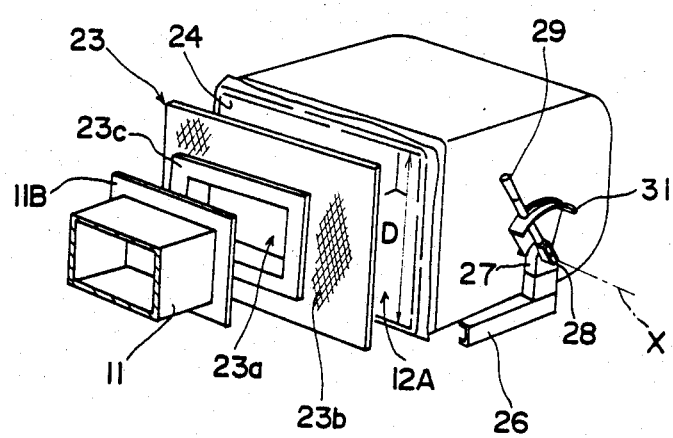
FIG. 2 is an exploded perspective view of a grass catcher.

Referring to FIG. 2, the grass catcher 12 comprises a bottomed tubular container having one side defining an opening 12A which has a substantially equal diameter to an inside diameter D of the grass catcher 12, and a lid member 23 attached to the opening 12A and defining a coupler opening 23a connectable to a discharge opening 11A of the discharge duct 11 and an air vent device 23b around the coupler opening 23a. The discharge opening 11A is defined by a rectangular frame 11B attached to an end of the discharge duct 11, and the coupler opening 23a is defined by a rectangular frame 23c mounted centrally of the lid member 23. The two frames 11B and 23c have opening sections equal in shape and size, and the coupler opening 23a and the discharge opening 11A are interconnected when the two frames 11B and 23c are in alignment.

The grass catcher 12 contains a polyethylene bag 24 in its interior space to receive grass clippings from the cutting unit 10 and to be disposed of when filled with the grass clippings. The lid member 23 and top edges of the grass catcher 12 together clasp an entire circumference of a top opening of the bag 24 to keep the bag 24 open.

Figure 3:
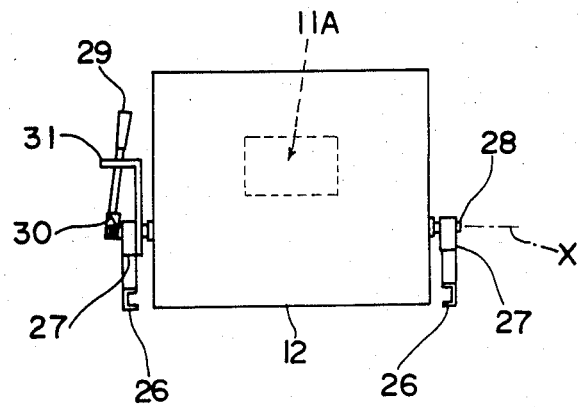
FIG. 3 is a rear view of the grass catcher.
Figure 4:
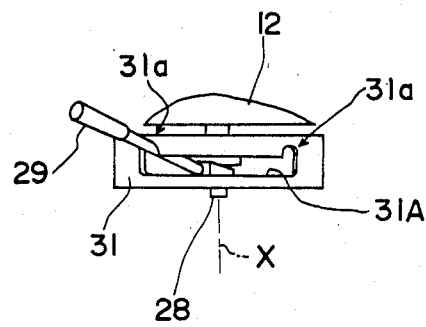
FIG. 4 is a plan view of a control lever support structure.

A support structure for the grass catcher 12 will particularly be described with reference to FIGS. 3 and 4. Stationary support frames 26 extend rearwardly from rear ends of right and left frames 25 of the vehicle body, and brackets 27 stand on these stationary frames 26 for supporting the grass catcher 12 to be oscillatable on a transverse axis X. The brackets 27 receive support rods 28 projecting from the grass catcher 12, and one of the rods 28 extends through one of the brackets 27. A control lever 29 is pivoted to an end of the rod 28 projecting from the bracket 27 for oscillating the grass catcher 12 in unison about the axis X of the support rods. The lever 29 is flexible about an axis perpendicular to the axis X of the support rods 28 and is urged toward the grass catcher 12 by a helical spring 30. A guide plate 31 defining a guide groove 31A is fitted on the control lever 29 for guiding right and left oscillations of the control lever 29. The guide groove 31A includes at opposite ends thereof enlargements 31a extending in a direction perpendicular to the guide groove 31A, for trapping the control lever 29 by virtue of the urging force of the spring and checking the movement of control lever 29 along the guide groove 31A. The control lever 29 is retained in one of the enlargements 31a when the grass catcher 12 is in a sideways turned posture to receive grass clippings. The grass catcher 12 may be switched from the sideways turned posture to an upright posture and retained in the latter posture by shifting the control lever 29 against the urging force into the other enlargement 31a.

Figure 5:
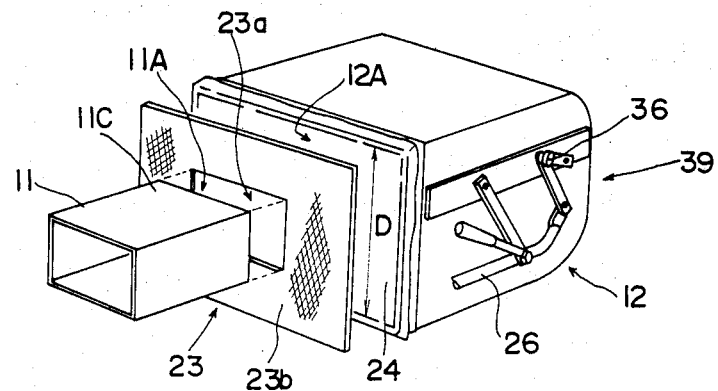
FIG. 5 is an exploded perspective view of the grass catcher.

In the embodiment shown in FIG. 5, the grass catcher 12 comprises a bottomed tubular container having one side defining an opening 12A which has a substantially equal diameter to an inside diameter D of the grass catcher 12, and a lid member 23 attached to the opening 12A and defining a socket opening 23a to receive an end of the discharge duct 11 defining a discharge opening 11A and an air vent device 23b around the socket opening 23a. With this construction it is necessary to provide a posture switching mechanism which causes the catcher 12 to make a parallel movement to fit the socket opening 23a to the end 11C defining the discharge opening 11A or withdraw the socket opening 23a from the end 11C and to turn into the upright posture.

Figure 6A:
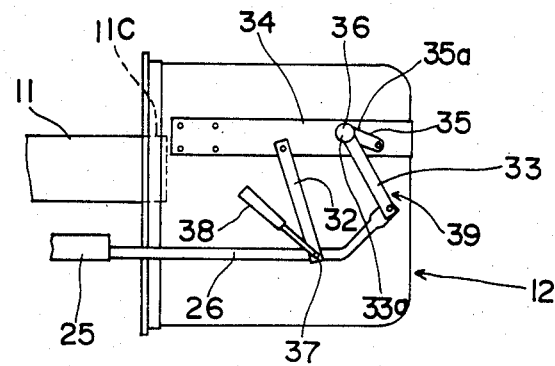
FIGS. 6 are side views of the grass catcher in its various postures, FIG. 6a showing a grass collecting posture, FIG. 6b showing a posture withdrawn from a discharge duct and filled with grass clippings, and FIG. 6c showing a posture for disposal of the grass clippings.
Figure 6B:
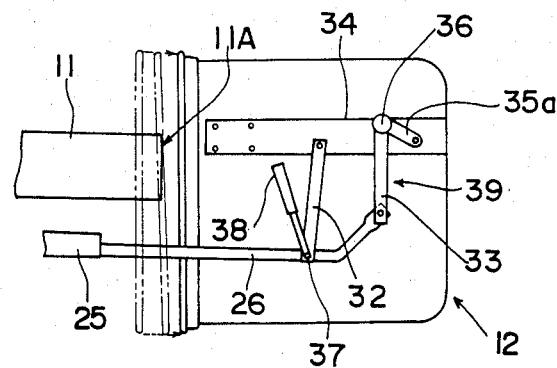
Figure 6C:
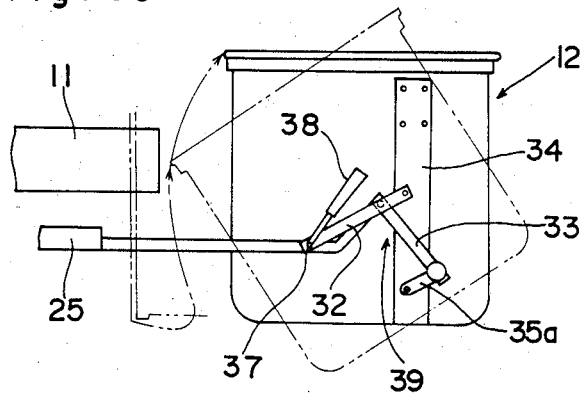
Figure 8:
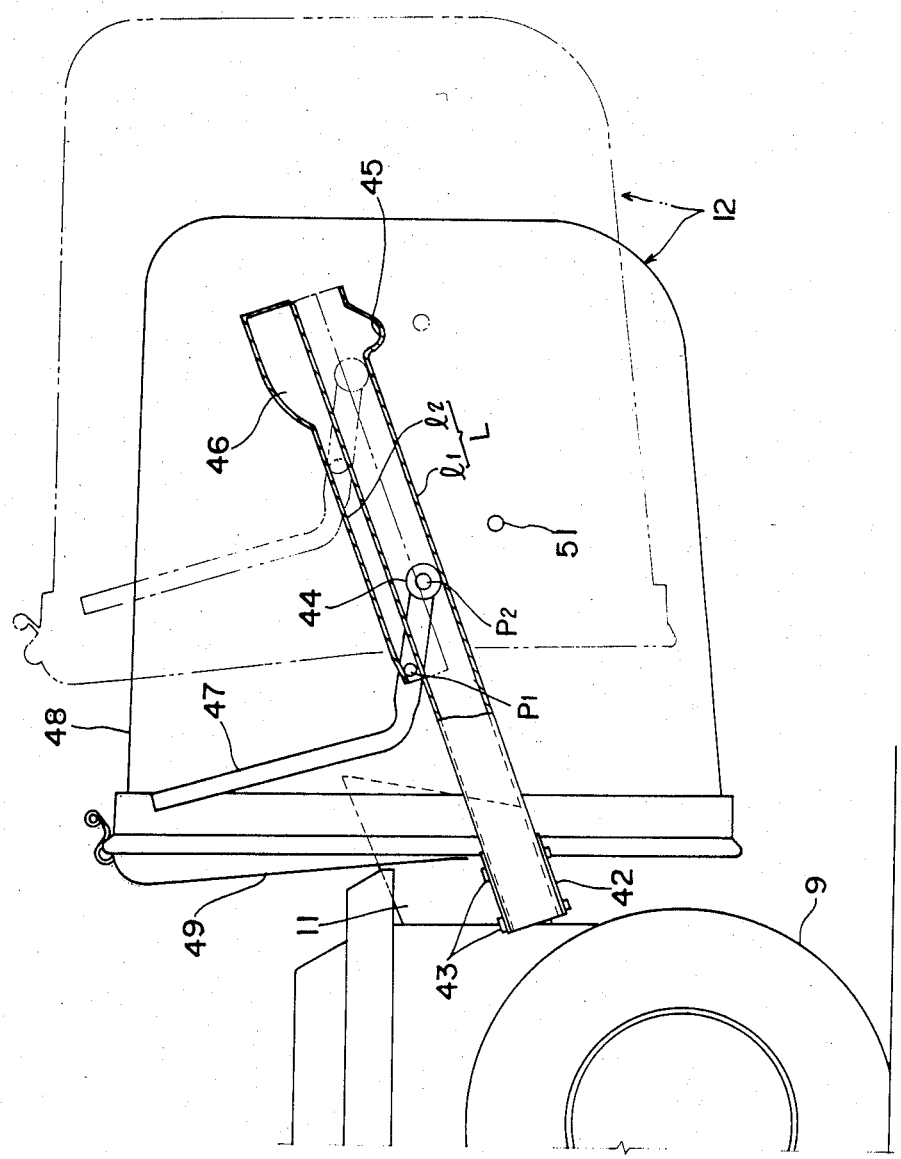
FIG. 8 is a side view of another switching mechanism.

Thus, the posture switching mechanism in this embodiment comprises a link mechanism as shown in FIGS. 6a through 6c. A first arm 32 and a second arm 33 are relatively oscillatably pivoted to each of the stationary frames 26 extending rearwardly from the rear ends of the right and left frames 25 of the vehicle body. Free ends of the two arms 32 and 33 are relatively oscillatably connected to a reinforcing frame 34 secured to the grass catcher 12. The second arm 33 which is located adjacent to the bottom of the grass catcher 12 has the extreme end thereof relatively oscillatably connected to a free end of a third arm 35 relatively oscillatably connected to the reinforcing frame 34 at a position closer to the bottom than is the second arm. A pin 36 used for this connection is extendible and retractable relative to the reinforcing frame 34, an engagement of and end of this pin 36 with an engagement bore defined in the reinforcement frame 34 checks the relative oscillation among the arms 32, 33 and 35. A control lever 38 is fixed to a support rod 37 connecting the first arm 32 to the stationary frame 26 so that the control lever 38 is oscillatable in unison with the first arm 32. Thus, the grass catcher posture switching mechanism 39 is adapted to change posture or position of the grass catcher 12 by oscillating the control lever 38 to actuate the link mechanism comprising the arms 32, 33 and 35.

To describe this operation more particularly, when the control lever 38 is operated with the grass catcher 12 in the sideways turned posture having the end 11C of the discharge duct 11 inserted into the socket opening 23a of the grass catcher 12 as shown in FIG. 6a, the grass catcher 12 retracts from the discharge duct 11 substantially linearly along the line of locus shown in FIG. 6b withdrawing the socket opening 23 from the end 11C. As the control lever 38 is further operated in a continuous manner, the grass catcher 12 is oscillated to the posture for disposal with the lid member 23 facing upwardly as shown in FIG. 6c.

To describe the working mode of the grass catcher 12, when the grass clippings are collected in the catcher in the sideways turned posture, the air entering the catcher 12 together with the grass clippings flows out through the air vent of the lid member 23 to permit the grass clippings to accumulate efficiently. In the upright posture after the grass collecting step, the lid member 23 is removed and the disposable polyethylene bag 24 containing the grass clippings is pulled upwardly out of the grass catcher.

Though not shown in the drawings, the discharge duct 11 has a vertically large inlet opening opposed to the cutting unit 10 to accommodate vertical movements of the cutting unit 10 resulting from ground conditions. It is therefore not necessary to provide a bellows or any complicated construction to permit the discharge duct 11 to follow such vertical movements.

Other examples of posture switching mechanism will be described hereinafter which comprise guided members attached to grass catcher 12 and guide rails attached to the vehicle body for guiding movements of the guided members.

Figure 7:
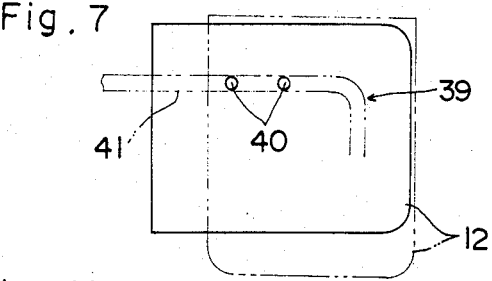
FIG. 7 is a side view of a modified switching mechanism for changing the grass catcher postures.
Figure 11:
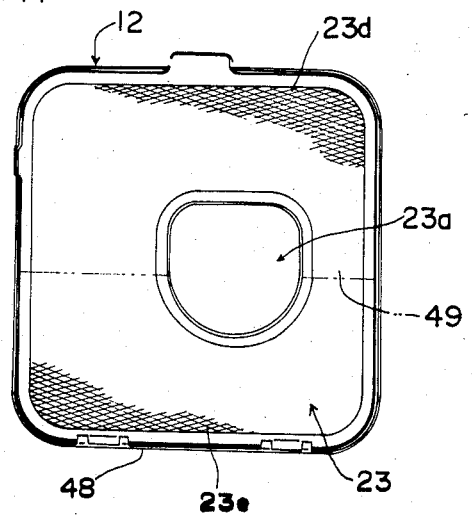
FIG. 11 is a front view of the grass catcher.

The posture switching mechanism shown in FIG. 7 comprises rollers 40 attached to the opposite sides of the grass catcher 12 and guide rails 41 secured to the opposite sides of the vehicle body for engaging and guiding the rollers 36. The grass catcher 12 is turned into the upright posture by the guiding function of the rails 41.

The posture switching mechanism shown in FIGS. 8 through 11 comprises railings L secured by means of pins 43 to channel-shaped brackets 42 extending from the vehicle body, and a pair of pins P1 and P2 attached to the side wall of the grass catcher 12 to be guided by each railing L. The grass catcher 12 in the sideways turned posture is supported by the railings L and the pins P1 and P2 to be capable of parallel movements relative to the discharge duct 11. It will be seen that one P2 of the pair of pins P1 and P2 is fitted with a roller 44.

The railing L comprises a first rail 11 having a channel-shaped cross section for supporting one of the pins P2 and a second rail 12 having an L-shaped cross section for supporting the other pin P1, the second rail extending rearwardly from an intermediate position of the first rail 11.

The first rail 11 defines a U-shaped engaging recess 45 at a rear portion thereof for positioning one of the pins P1 and P2. The second rail 12 is curved at a rear portion thereof to define an allowance portion to accommodate movement of the other pin P1 when the grass catcher 12 oscillates about the pin P2 fitted in the roller 44 positioned in the rear portion of the second rail 12. The operation to oscillate the grass catcher 12 to the upright posture and to the downwardly turned posture by shifting a control lever 47 fitted to and supported by the two pins P1 and P2 will be described next.

The grass catcher 12 in the sideways turned posture in caused to make the parallel backward movement away from the discharge duct 11 first. When the roller 44 engages the engaging recess 45, the pin P1 becomes movable through the allowance portion 46. As the control lever 47 is oscillated downwardly, the grass catcher 12 oscillates about the pin P2 of the roller 44 held in position and assumes the upright posture, the grass catcher 12 remaining in that posture by gravity. By shifting the control lever 47 further downwardly the grass catcher 12 oscillates into the downwardly turned posture. The grass catcher 12 is provided with projections 51 acting to contact the second rails 2 and prevent an upward movement of the grass catcher 12 when the grass catcher 12 has oscillated to the downwardly facing posture.

The grass catcher 12 further includes a lid member 23 at a top thereof adapted to swing open and close about a horizontal axis Y and defining a grass inlet 23a having a size to receive the end 11C of the discharge duct 11.

The lid member 23 defines air vents 23d and 23e above and below the grass inlet 23a, and an air guide member 49 integral with the lid member 23 and covering the upper air vent 23d to downwardly guide air discharged from the upper air vent 23d. This construction checks the air from the vents 23d and 23e blowing forwardly.

In the drawings, numbers 49a and 49b denotes engaging elements provided on the catcher 48 and the lid member 23 which are engageable and disengageable by oscillations of the lid member 23. Number 50 denotes a netting applied to the lid member 23 for air releasing purposes.

We claim:

1. A lawn mower comprising:
   a vehicle body,
   a cutting unit supported by the vehicle body,
   a grass catcher mounted rearwardly of the vehicle body and including an opening in one side thereof directed to the front of the vehicle body,
   a discharge duct extending between the cutting unit and grass catcher and including an end defining a discharge opening for transmitting grass clippings from the cutting unit to the grass catcher,
   a lid member removably attached to the opening of the grass catcher and including a socket opening engageable with the end of the discharge duct and an air vent defined at least around the socket opening, and
   grass catcher posture switch means for switching the grass catcher between a sideways turned posture in which the end of the discharge duct is inserted into the grass catcher through the socket opening and an upright posture in which the socket opening is directed upwardly, said posture switch means displacing the grass catcher rearwardly prior to switching from the sideways turned posture to the upright posture, to position the end of the discharge duct outside of the grass catcher.

2. A lawn mower as claimed in claim 1 wherein the grass catcher posture switch means is adapted to switch the grass catcher by a combination of a first step for causing a parallel movement of the grass catcher to move the socket opening relative to the end of the discharge duct and a second step for turning the grass catcher into the upright posture to direct the socket opening upwardly or sideways.

3. A lawn mower as claimed in claim 2 wherein the lid member includes an air guide member for downwardly guiding air released from a portion of the air vent positioned upwardly of the socket opening.

4. A lawn mower as claimed in claim 2 wherein the grass catcher posture switch means includes engaging means mounted on opposite lateral sides of the grass catcher, and guide rail means extending rearwardly from opposite lateral sides of the vehicle body to engage and guide the engaging means so that the grass catcher is switchable between the two postures by the combination of the first and second steps.

5. A lawn mower as claimed in claim 4 wherein the guide rail means includes a first portion extending parallel to a center line of the discharge opening of the discharge duct and a second portion extending in a direction perpendicular to the first portion.

6. A lawn mower as claimed in claim 4 wherein
the guide rail means each comprise a first rail extending rearwardly of the vehicle body and a second rail extending rearwardly from an intermediate portion of the first rail, and
the engaging means each comprise first and second engaging members mounted on a lateral wall of the grass catcher, the first engaging member being in engagement with and guided by the first rail and the second engaging member being in engagement with and guided by the second rail,
the first rail including a downwardly projecting engaging recess at a rear end thereof, and
the second rail including an upwardly projecting allowance portion at a rear end thereof,
wherein the grass catcher turning step is taken with the first engaging member resting in the engaging recess and the the second engaging member moving through the allowance portion.

7. A lawn mower as claimed in claim 6 further comprising a control lever fitted on and supported by the first and second engaging members.

8. A lawn mower as claimed in claim 7 wherein the engaging members comprise pins.

9. A lawn mower as claimed in claim 8 wherein the first engaging member includes a roller fitted thereto.

10. A lawn mower as claimed in claim 2 wherein the grass catcher posture switch means comprises a link mechanism pivotally connected between the vehicle body and the grass catcher.

11. A lawn mower as claimed in claim 10 wherein the lid member includes a portion of the air guide member for downwardly guiding air released from an air vent positioned upwardly of the socket opening.

12. A lawn mower as claimed in claim 10 wherein the link mechanism comprises:
a first arm having one end thereof pivoted to a supporting frame extending rearwardly of the vehicle body and another end pivoted to the grass catcher,
a second arm substantially parallel to the first arm and having one end thereof pivoted to the supporting frame, and
a third arm having one end thereof pivoted to the grass catcher and another end thereof relatively oscillatably connected to another end of the second arm.

13. A lawn mower as claimed in claim 12 further comprising a control lever fixed to the first arm to be oscillatable in unison therewith.

* * * * *